United States Patent [19]
Zani et al.

[11] Patent Number: 5,516,187
[45] Date of Patent: May 14, 1996

[54] ACTIVATION AND LOCKING DEVICE FOR SUN ROOFS OF VEHICLES AND THE LIKE

[75] Inventors: Bruno Zani; Duilio Zani, both of Lumezzane, Italy

[73] Assignee: Zani S.R.L., Lumezzane, Italy

[21] Appl. No.: 351,669

[22] Filed: Dec. 8, 1994

[51] Int. Cl.$^6$ .................................................. B60J 7/047
[52] U.S. Cl. ........................................ 296/223; 296/224
[58] Field of Search ...................................... 296/221–224

[56] References Cited

U.S. PATENT DOCUMENTS

| | | | |
|---|---|---|---|
| 4,647,104 | 3/1987 | Kohlpaintner et al. | 296/221 |
| 4,647,106 | 3/1987 | Furst | 296/223 |
| 4,650,243 | 3/1987 | Hanley et al. | 296/221 |
| 4,664,436 | 5/1987 | Eyb | 296/121 |
| 4,998,771 | 3/1991 | Schreiter et al. | 296/217 |
| 5,040,845 | 8/1991 | Huyer | 296/222 |
| 5,069,500 | 12/1991 | Reihl et al. | 296/214 |
| 5,288,125 | 2/1994 | Huyer | 296/216 |
| 5,335,961 | 8/1994 | Reinsch et al. | 296/213 |

FOREIGN PATENT DOCUMENTS

| | | | |
|---|---|---|---|
| 480166 | 4/1992 | European Pat. Off. | 296/221 |
| 562519 | 9/1993 | European Pat. Off. | 296/222 |
| 94025301 | 11/1994 | WIPO | 296/222 |

*Primary Examiner*—Dennis H. Pedder
*Attorney, Agent, or Firm*—Bucknam and Archer

[57] ABSTRACT

Activation and locking device for opening and closing a sun roof for a motor vehicle which includes a tow-sliding carriage (24) coupled to an entraining body (111) through grooved side levers (28) wherein fulcrum pins (26) of round sector lever (13) provided with a toothed round sector (14) engage. The lever (13) and said entraining body (111) are coupled to a shaped lever (5) for the hooking and support of the sliding glass or cove ring (1) of the sun roof. The assembly of carriage (24), entraining body (111) and shaped lever (5) slides in guides provided in guide section (20). The carriages (24) are provided with front side arms (122) having longitudinal eyelets (132) wherein engage the side sliding slides (115) of the entraining body (111), the through pins (118) provided at the front ends (117) of shaped lever (5) and pins (160) of lock-teeth (161). A locking system is provided having a pin (180) coupled to a corresponding side groove (81) provided with an opening (84) and an upper internal filleted wall (85).

3 Claims, 7 Drawing Sheets

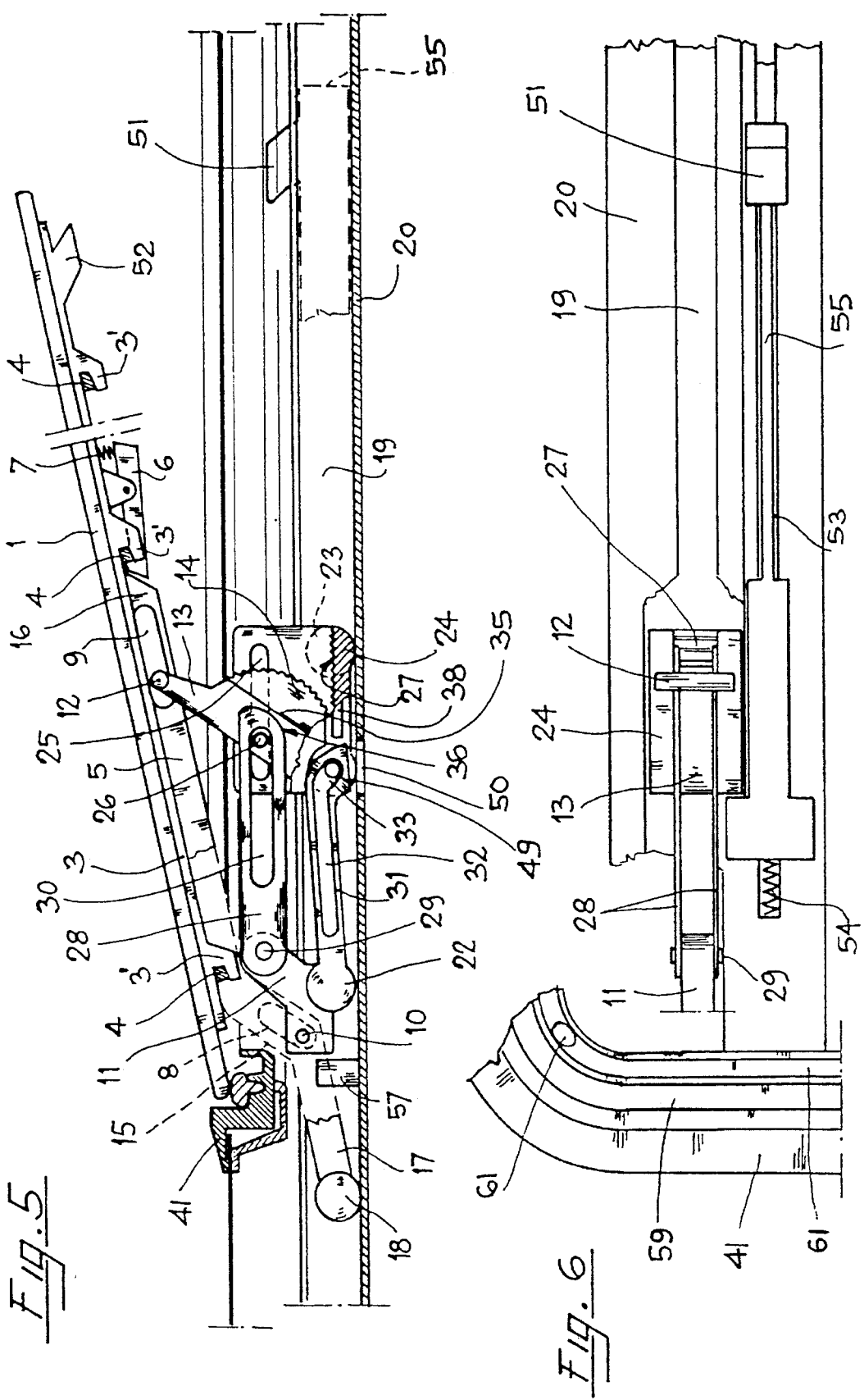

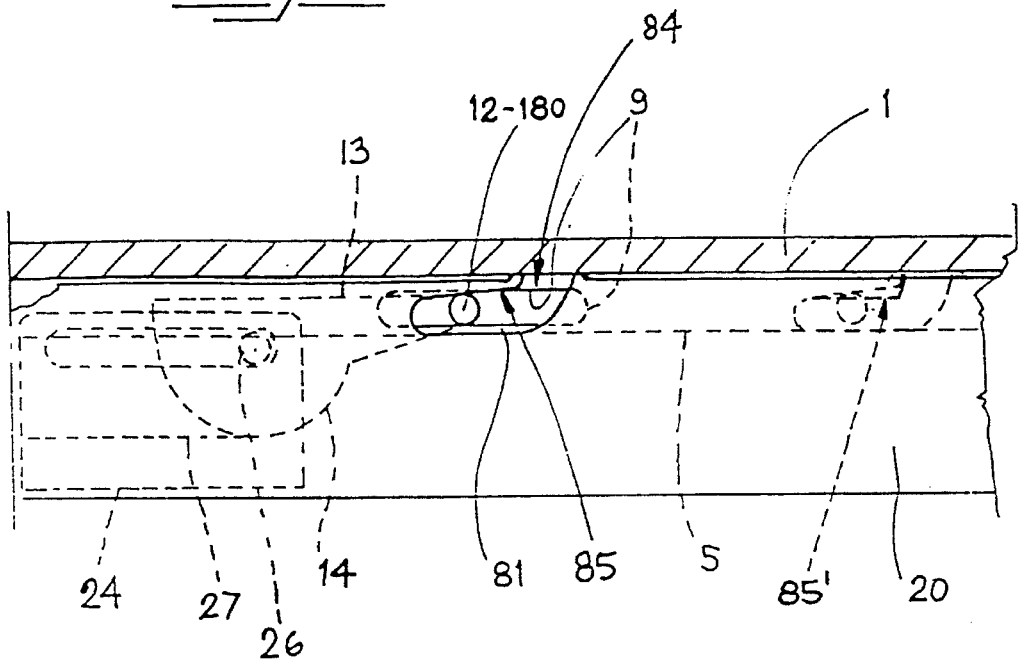
Fig. 14
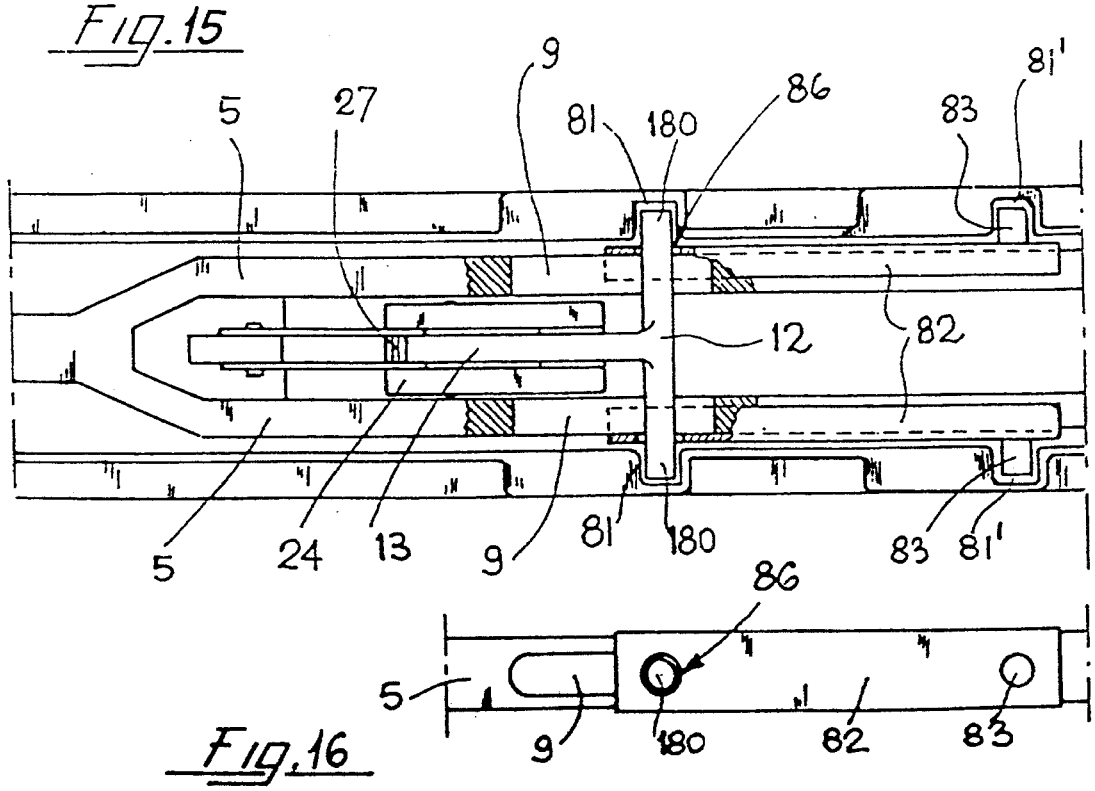
Fig. 15
Fig. 16

5,516,187

ACTIVATION AND LOCKING DEVICE FOR SUN ROOFS OF VEHICLES AND THE LIKE

FIELD OF THE INVENTION

This invention relates to an activation device for opening and closing interchangeable, transparent or opaque, insulated or not insulated sun roofs for motor vehicles, substantially constituted by stiff supports, fastened to the sun roofs, on which hooking means are provided which engages into as many notches positioned on shaped sliding levers. Each lever comprises a couple of mobile fulcrums which engage at the end of entraining bodies and of through pins of levers provided with a toothed round sector. The toothed sectors meshes with racks integral with entrainingly sliding carriages on which the sectors are pivoting, with the possibility of shifting longitudinally along slits.

The entraining bodies and the carriages are connected to one another by means of sliding plates which have the function of guiding the longitudinal and rotary movement of the toothed circular sector during the lifting and/or lowering and the opening and/or closing translation of the sun roofs. The assembly has an entraining movement and hooking, preferably but not limited to helical cables coupled to a gear system, preferably with rotation gearing-down, activated by a foldable crank or an electric motor. Carriages may be equipped with side arms provided with longitudinal sliding eyelets for side slides of the entraining bodies. The shaped sliding levers comprise at their front ends a third mobile fulcrum constituted by through pins engaged at the front ends of the longitudinal eyelets of the arms.

Locking and unlocking teeth are coupled to the front guides, intervention of which depends on the longitudinal sliding of the arms of the sliding carriages and the engagement of corresponding pins in the aforementioned eyelets.

One or more slanting or horizontally flush grooves with filleted or slanting stress raising opening are formed on the fixed structures of the guide sections, lateral relative to the central sliding seat of the mobile carriages.

In the groove or grooves the protruding side ends engage the orthogonal pins of the levers provided with a toothed round sector. The engagement of the ends in the grooves and their sliding along the slanting connections or stress raising openings or in the slanting direction of the grooves, cause the orthogonal pins of the levers provided with a toothed round sector and the respective shaped levers to which the sun roofs are connected to shift downwardly, and the sun roofs, when closed, to be pressure-tight on the peripheral gaskets.

The slanting or horizontally flush grooves with filleted or slanting stress raising opening are formed on the sides of the opening and closing means of the sun roofs and are preferably positioned in the front half of the open spaces occupied by the sun roofs.

Alternatively, pins may be provided on the side sliding guides, while the complementary slanting or flush grooves may be obtained on the sliding carriages and/or the mobile parts.

Folding sun roofs, applied or applicable in the first or second assembly on motor vehicles in general, are substantially provided with opening and/or closing means having different structures and configurations according to the applications, the more or less expensiveness required of the product, and their function.

In particular, many carriages are provided with devices, hand or electrically operatable, which allow their back lifting and the subsequent backwards opening sliding.

This construction involves a correct positioning of the sun roofs when open, allows a comfortable aeration of the inside of the vehicle, though remaining in a substantially valid position from the aerodynamic point of view, with a correct orientation against the apparent wind flow produced by the movement of the vehicles and a stable accident-preventing orientation.

However such advantageous features are obtained in the known control, positioning and safety devices through members that are very complicated, expensive and prone to breakdown. Another drawback is constituted by the fact that the complexity of such mechanisms, and in particular the sun roof lifting and supporting devices, reduces remarkably their very effectiveness, allowing only rather small openings. In particular, the maximum openings with backwards translation of sun roofs that are possible today are limited to about one third of the total available space of the sun roof.

Such condition is obviously a limitation as concerns the main purpose of said sun roofs.

It is also known that all the folding sun roofs for motor vehicles and the like, besides the opening, adjustment and closing means, are provided with additional hooking means which, in the closing stage, engage with fixed complementary means, to constitute a stable connection suitable to ensure the absence of unintentional or accidental openings and/or unpleasant vibrations.

Such hooking means are generally constituted by hooks or the like, which, when sun roofs are completely lowered, are caused to slide axially until their shaped ends engage into complementary eyelets obtained on the sun roofs; they are preferably located at the back ends of the guide sections of the control sliding devices.

However, their configuration, though being effective from a functional point of view, is rather complicated and requires several components which complicate the construction, assembly and maintenance of sun roofs.

SUMMARY OF THE INVENTION

An object of this invention is to overcome the drawbacks mentioned hereinabove. The present invention solves the problem by means of an activation device for opening and closing and locking sun roofs of motor vehicles and the like with the following results: the body of the sun roof is supported by stiff supports held in position by hooking means which engage with shaped sliding levers which, while making an oscillatory movement during the opening and/or closing, remain strongly engaged with the entraining bodies; these entraining bodies are connected to sliding carriages through hooking, anchoring, guide, and rotation allowing or disallowing members and levers; the sliding devices shift along metal sections the configuration of which is especially designed for a perfect and long guide of same. The mobile carriages which carry out the operation of lifting the back part of sun roofs and which allow their axial sliding during the opening and/or closing stages, are provided with extensions which, during closing, engage and cause the progressive axial downwards translation of the sun roofs connected to them. This translation is a natural consequence due to the axial movement of mobile carriages in general, and in particular of the carriages provided with racks coupled to levers provided with a toothed round sector which rotate during the translation, lifting the sun roofs by means of their engagement in grooves obtained on the shaped levers for the support and sliding of the sun roofs. The engagement of these extensions, with the relevant slanting or horizontally flush side grooves with filleted or slanting stress raising opening, develops during the rotation end stage of the above levers provided with a toothed round sector or the like and during the sequential end stage of axial translation of the mobile carriages.

The advantages achieved through these devices lie essentially in the fact that all the activation devices are strongly engaged between one another, forming very compact, stiff and safe structures; the sliding of the entrainment means is long enough to allow an opening greater than half the available span of the sun roof; such opening may even reach about two thirds of this span, without affecting the structural characteristics of strength and stability of the entire assembly.

Further advantages are due to the fact that the activation devices are constituted by a plurality of components, limited and simple enough to render the assembly easily assemblable and disassemblable, suitable for simple maintenance, and, basically, rather economical.

Still further advantages are constituted by the fact that the global configuration of the safety closing systems of folding sun roofs is much simpler, in spite of their effectiveness, and can be realized, assembled and kept efficient more easily.

Still another advantage arises from the fact that such hooking devices may be single, for each side, or double, as a function of the two protruding ends of the pins of the mobile or circular sector levers, or even they may be in greater number and/or different positions as a function of additional plates sliding on the shaped, sun roof supporting levers, provided with several side pins protruding from one side or both sides, engaged in the protruding pins of the levers provided with a toothed round sector or the like, and connectable to as many side slanting or horizontally flush grooves with filleted or slanting stress raising openings, depending on the number of the protruding pins; said pins and said grooves being arrangeable also in the opposite way.

BRIEF DESCRIPTION OF THE DRAWINGS

The invention is described in detail in the following, according to preferred non-limitative embodiments, with reference to the enclosed drawings, wherein:

FIG. 5 is a longitudinal cross section of a device as a whole, in a first embodiment, FIG. 6 is a partial plan of the sliding carriage-hooking means connection in closing conditions, FIG. 14 is a side view of the same device of FIG. 12 in full closing position, FIG. 15 is a plan view of an example of multiple locking device, and FIG. 16 is a side view of the detail of a plate for locking devices.

DETAILED DESCRIPTION

Figure 1:
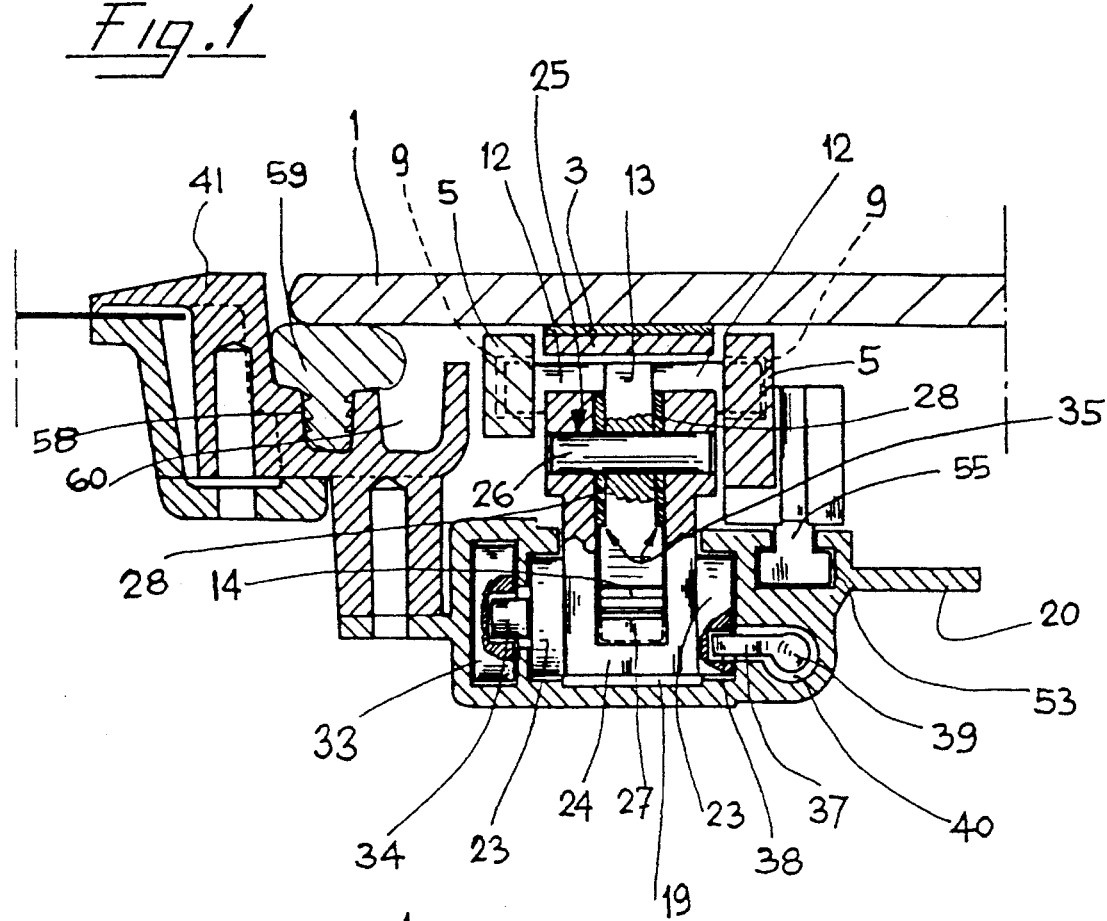
FIG. 1 is a cross section of a device corresponding to one side of a roof, in closing conditions.
Figure 2:
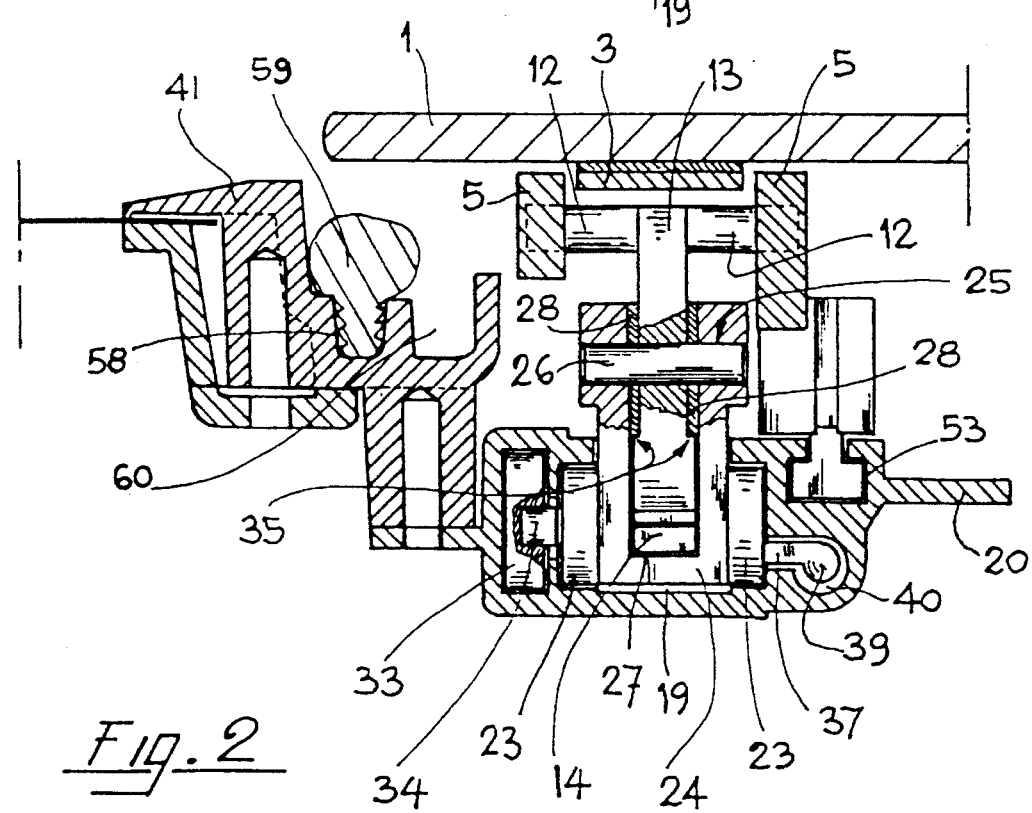
FIG. 2 is the cross section of the device, in opening conditions.
Figure 3:
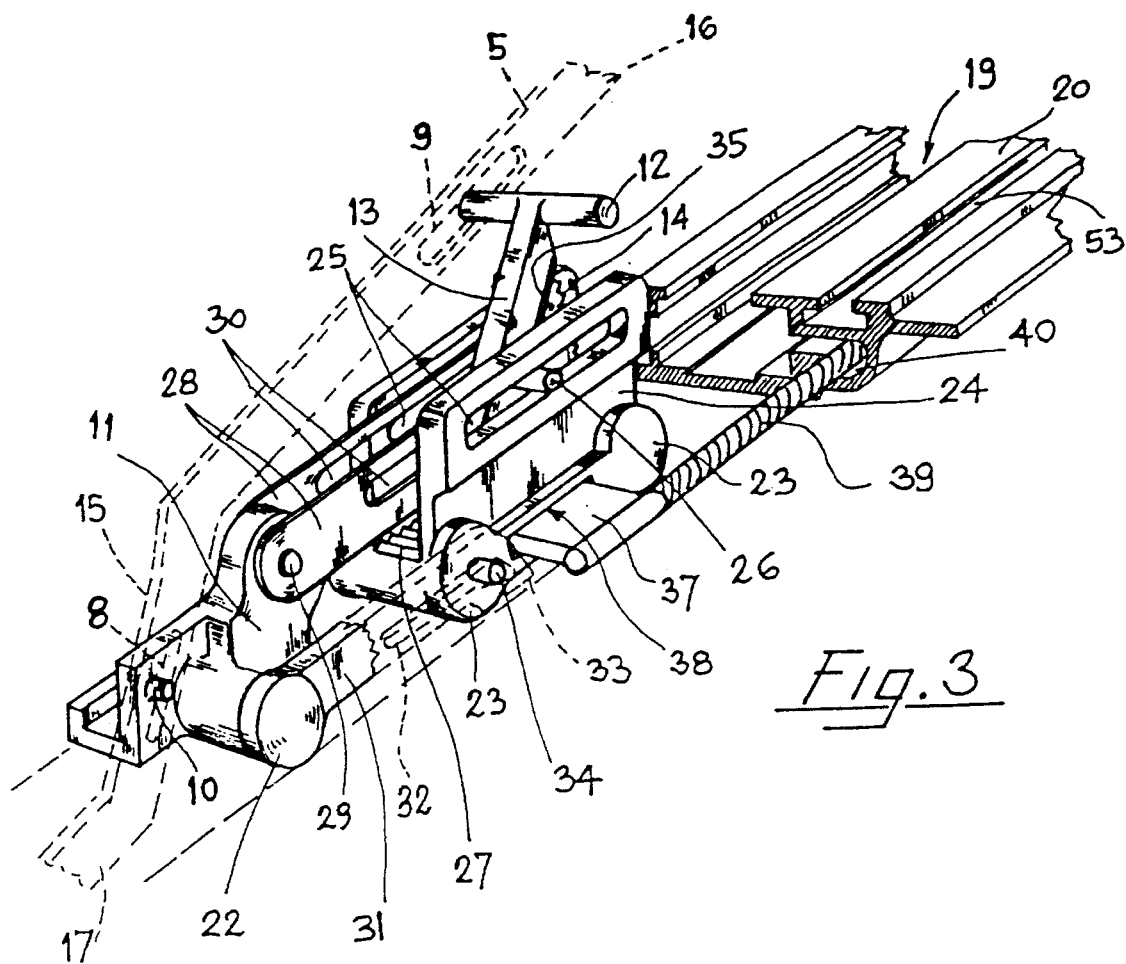
FIG. 3 is a partial perspective view of a carriage with entrainer of one of such devices.

The figures show a device for activating the opening and closing of sun roofs for motor vehicles in which a glass or a sliding, interchangeable, transparent or opaque, insulated or not insulated covering (1) is supported, along both its side edges, by stiff supports (3), on which two hooking teeth are formed (3'), which, when the entire device is assembled, engage with as many notches (4) provided on one of the shaped sliding levers (5).

At least one of the notches (4) is coupled with a locking lever (6) by an elastic pressure means (7).

This hooking creates a stiff and stable connection between the supports (3) and the respective shaped levers (5), which levers, in a first embodiment illustrated by way of example, have two slit configurations (8) and (9) wherein pins (10) provided at the front ends of the entraining bodies (11) and pins (12) provided at the side ends of the levers (13) provided with a toothed round sector (14) engage.

The shaped levers (5) take on a configuration partly deviated at the height (15) of slit (8), to resume then again a rectilinear shape, parallel at their ends (17) to which at least a cylindrical element or a sliding wheel (18) is coupled.

Each element (18) slides along side guides comprised in the central seat (19) of a section (20) constituting one of the two side guides of the glass or covering (1). Next to such seat (19), the cylindrical element or wheel (22) of each entrainer (11) slides along one of the side guides, while in the same central seat the cylindrical elements or wheels (23) of carriages (24) also slide. Carriages (24) have lateral walls provided with slits (25) wherein the end of pins (26) constituting the fulcrum of levers (13) engage. The toothed sectors (14) of the above levers (13) mesh with racks (27) integral with the carriages and located on their basis between the side walls. Each entrainer (11) couples with the corresponding carriage (24) through two parallel levers (28), which, on one hand, have their fulcrum or side pins (29) integral with the entrainers and, on the other hand, have slits (30) wherein the fulcrum pins (26) of the levers provided with a toothed round sector (13) slidingly engage.

The entrainers (11) comprise also lower extensions (31) provided with longitudinal grooves (32) with bent ends (33). Two pins (34), substantially coaxial to the wheels or cylindrical front bodies (23) of carriages (24) engage with these grooves. The parallel levers (28) are located at the sides of the levers (13) provided with a toothed round sector (14) and serve the function of longitudinal guides of same, because when the sun roof is closed (FIG. 1), they trailingly engage with the linear secton peripheral edges (35) obtained on the side of same. On the contrary, the ends (36) of the levers are spoke-like and allow the correct rotary guide of levers (13) during the rotary motion which leads to the lifting and opening of the sun roof.

The sliding in the two directions of the described devices is preferably but not limitedly obtained by means of a tooth

Figure 4:
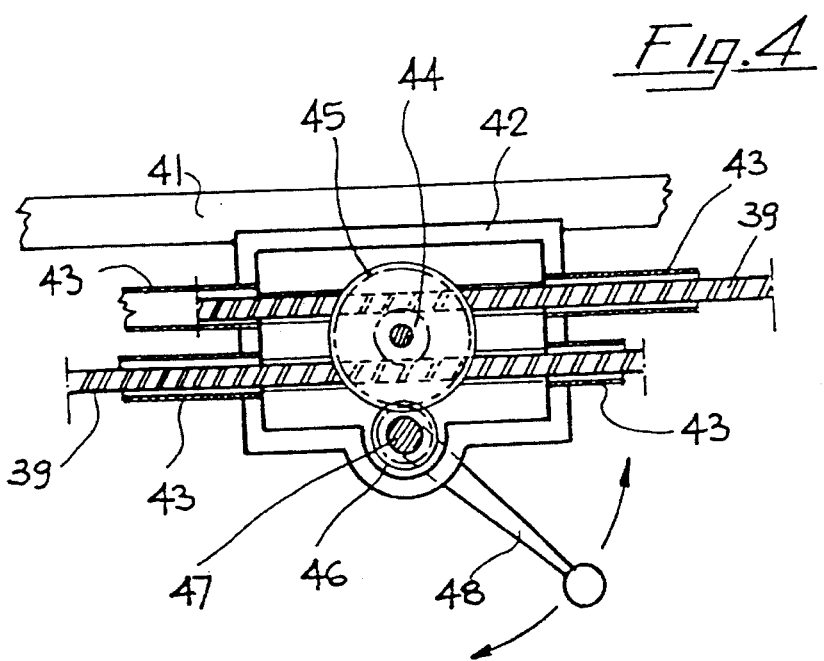
FIG. 4 is an example of control of the activation device, with reduction gear and helical cables.
Figures 7, 8:
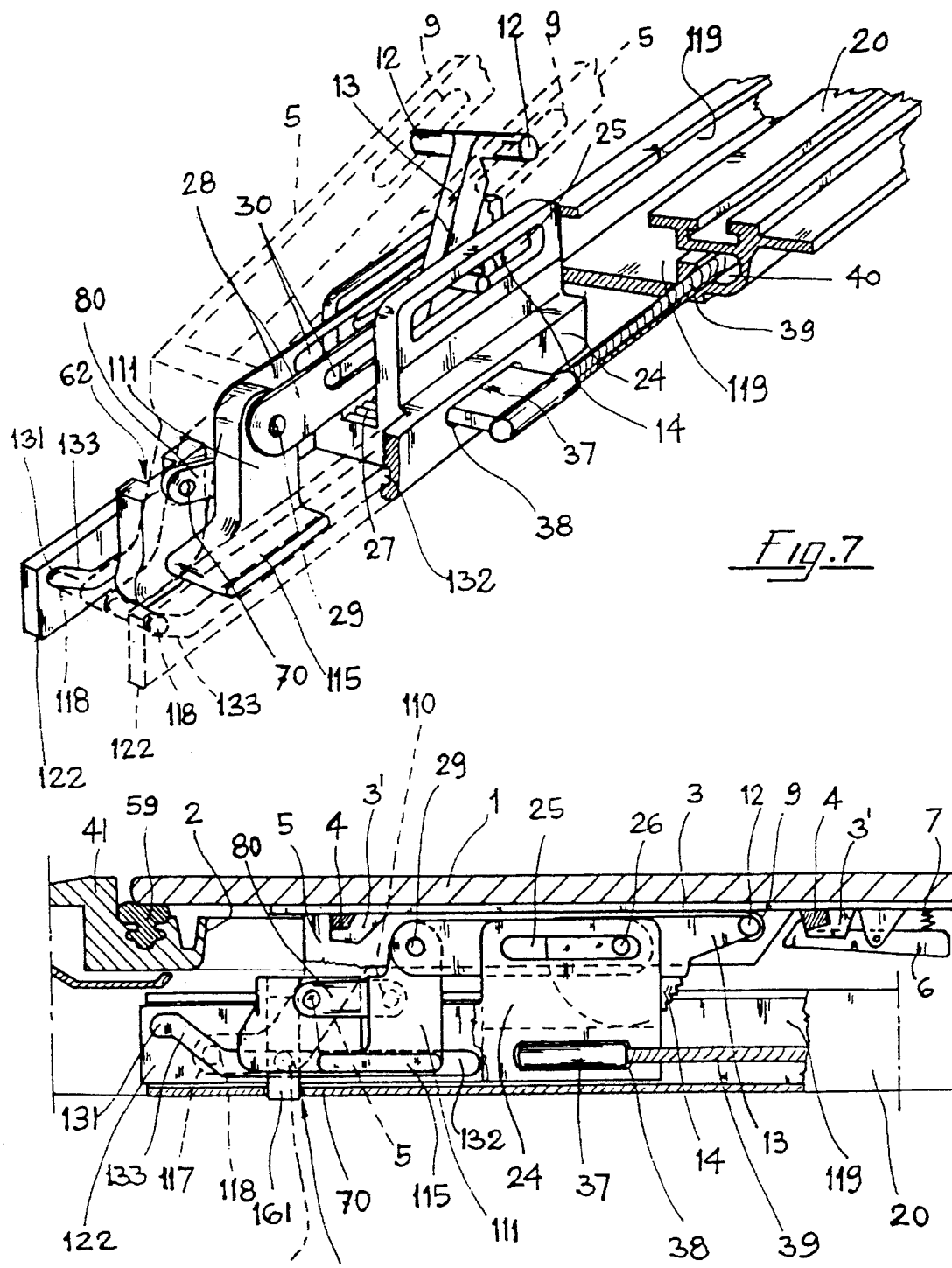
FIG. 7 is a perspective view of a device according to a second embodiment.
FIG. 8 is a partly cross sectional side view of the device of FIG. 7 in closing position.
Figure 9:
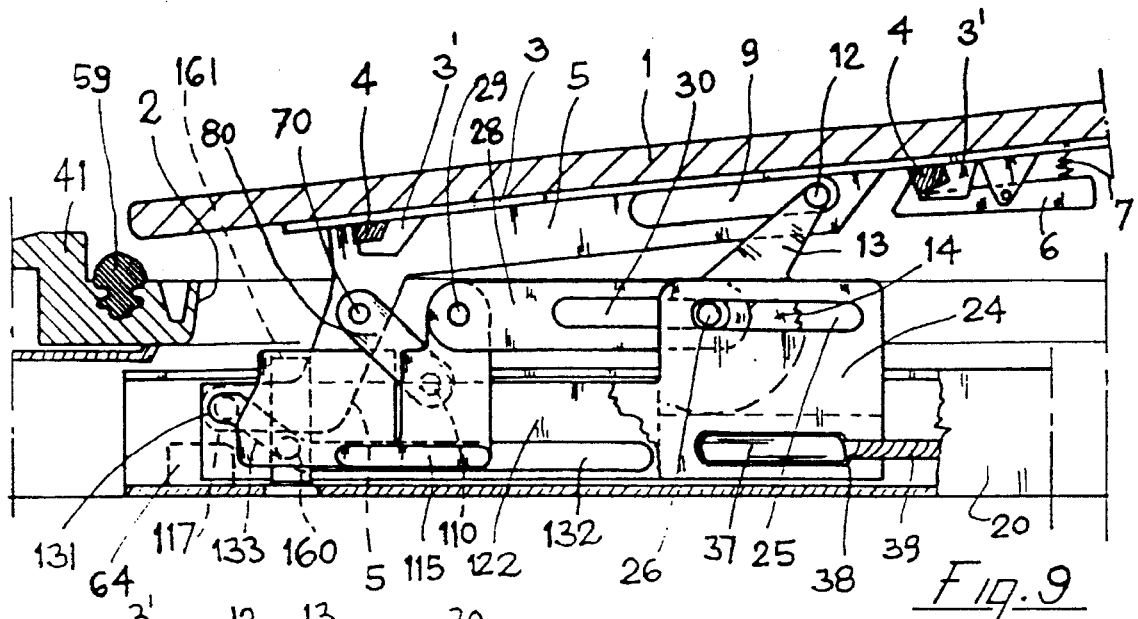
FIG. 9 is a partly cross sectional side view of the same device of FIG. 7, in opening position.
Figure 10:
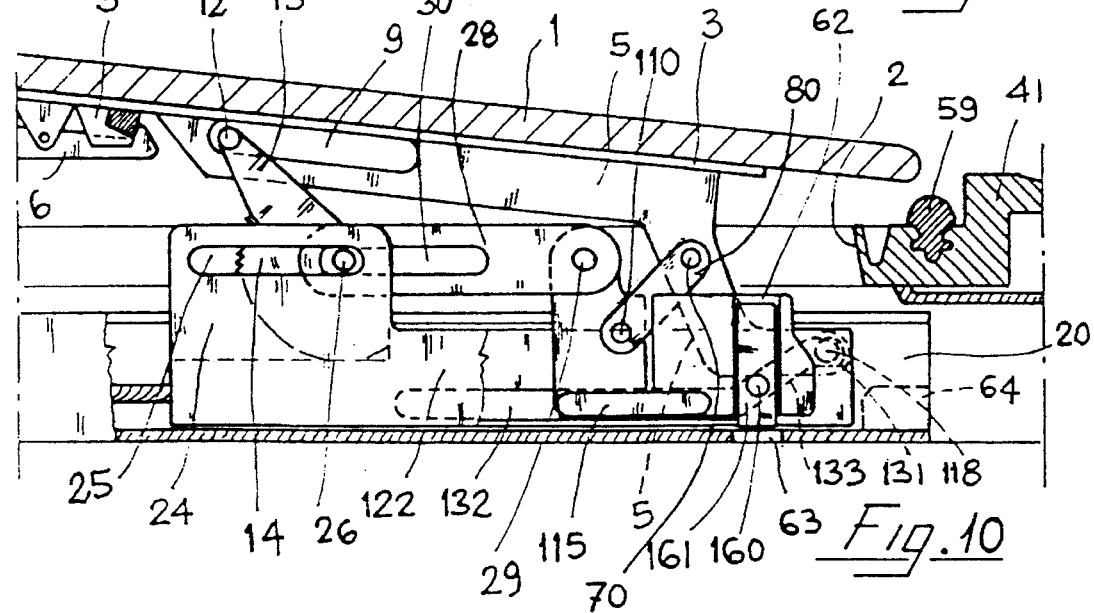
FIG. 10 is the same device of FIG. 7, seen from the side opposite to that of FIG. 9.
Figure 11:
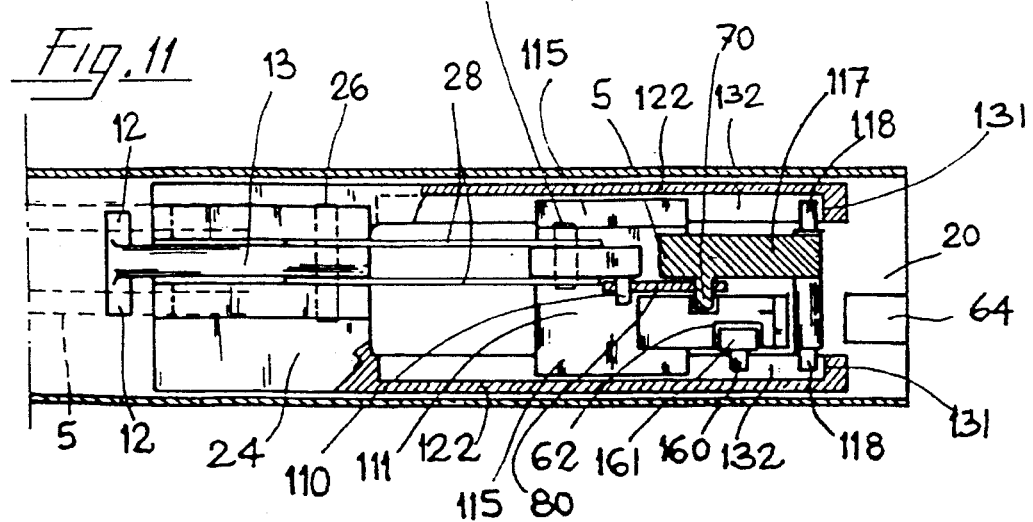
FIG. 11 is a schematic plan view of the same device of FIG. 7.
Figure 12:
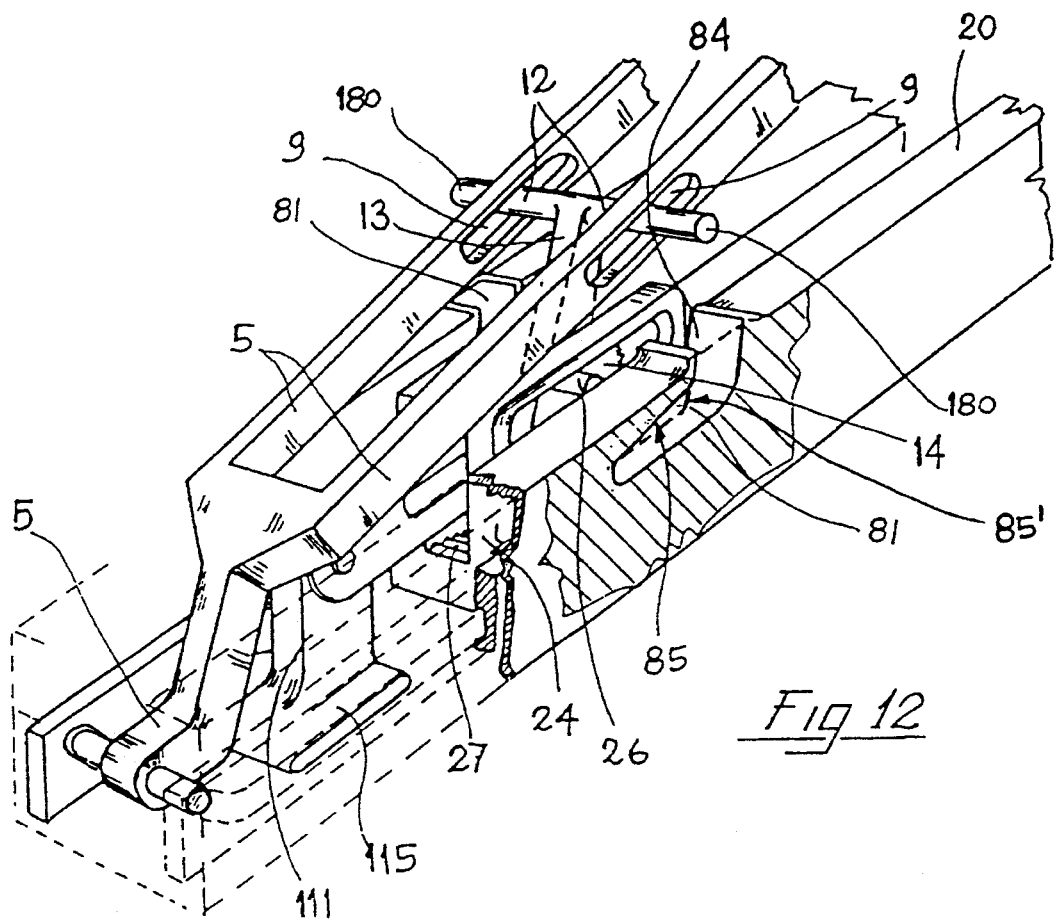
FIG. 12 is a schematic perspective view of the device with the side locking means to pins engaged in grooves.
Figure 13:
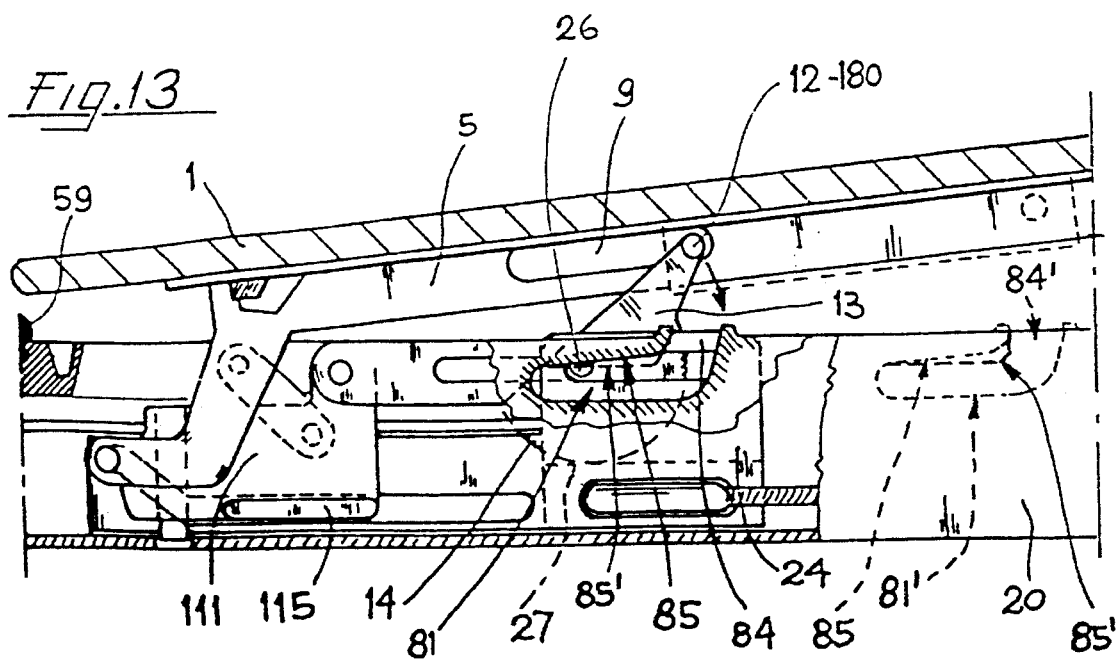
FIG. 13 is the side view of the same device of FIG. 12 in half-hooking positions.

(37) which engages in a housing (38) formed laterally with respect to the carriages (24). To each tooth (37) a flexible spiral cable (39) is connected, which extends along a hollow path (40) formed beside section (20). In the central front part of the fixed frame (41) of the sun roof (FIG. 4) a control is provided, in a substantially known way, which controls the activation devices subject matter of this invention.

In particular, this control comprises a box (42) with superposed and parallel tubular elements (43) wherein the two spiral cables (39) slide which extend respectively up to the hookings or tooth (37) of the sliding carriages (24), provided along the fixed side guides (20). The sliding of the spiral cables (39) between box (42) and the sliding carriages (24) is through the parallel tubular elements (43) which converge in the hollow paths (40) provided in sections (20) constituting the side guides.

The parallel cables (39) mesh in a diametrically opposed position with a helical toothed wheel (44) and another gear (45) having a greater diameter and a greater number of teeth is keyed on the axis of rotation of this toothed wheel (44).

To gear (45) a pinion (46) is coupled, forming in this way a reduction gear which facilitates the sliding maneuvers of the translation members, at a more than moderate speed.

To the central keying pin (47) of pinion (46) a known crank (48) for the hand movement is preferably but not limitedly fastened. Alternatively, this crank may be replaced by known electrical means.

In the opening movement, when crank (48) is caused to rotate, the helical cables (39) are subject to traction; teeth (37) engaged in housings (38) start entraining carriages (24), while entrainers (11) remain temporarily still in their position, because the end teeth (49) of their extensions (31) remain engaged in hollow spaces provided on the bottom of sections (20).

The backward shifting of carriages (24) causes the recovery of the closing tie-rods (55), releasing their teeth (51) from those (52) provided on the ends of the sliding shaped levers (5). Tie-rods (55), sliding along side grooves (53) of sections (20) engage, in the closing stage, the carriages (24). In the opening stage, they are recovered by return springs (54) which cause them to move backwards.

In the above hooking stage, carriages (24) move back, keeping levers (13) in closing position; in fact the side levers (28) act on levers (13), while the side levers (28) slide along the rectilinear peripheral edges (35), excluding the possibility of rotation around the fulcrum pins (36). The sliding is allowed by slits (25) of the carriages and by slits (30) of the side levers (28). After the unhooking, the back, spoke-like ends (36) of the side levers (28) are concentrically aligned with the fulcrum pins (26), while the opposing pins (12) of levers (13) are pushed at the back end of slits (9), provided on the shaped sliding levers (5). As the backwards sliding of carriages (24) goes on, the toothed round section levers (13), released from the engagement of the rectilinear edges (35) of the side levers (28), start rotating upwards, entrained by the meshing of teeth (14) with racks (27); their rotation causes the lifting of pins (12) and consequently of levers (5), engaged with same, of the stiff supports (3) and of the glass or covering (1). This lifting is limited to the back part of the sun roof, as the front part of same, with the associated stiff supports, adjusts to the slanting position adopted by the shaped levers (5), the end (17) of which with the sliding cylindrical elements or wheels (18) still adheres to the guides comprised in sections (20).

As the sliding goes on, the sun roof, with the back part lifted, translates backwards. This is possible as pins (24), coaxial with wheels or front cylindrical elements (23) of carriages (24) engage the end bent part (33) of the longitudinal grooves (32) provided on the extensions (31) of entrainers (11). Such engagement causes the lifting of the end teeth (49) and their disengagement from the hollow spaces (50) provided on the bottom of sections (20). Now, both carriages (24) and the entraining bodies (11) translate backwards, and the glass or covering (1) shifts in the same direction, keeping its slanting position, until it uncovers a large part of the underlying span. Thanks to the small size of the devices, their compactness and the sliding they can perform along guides (20), the open space created by the backwards sliding of the sun roof may reach a dimension equal or greater than two thirds of its length.

By reverting the rotatory motion of carriages (24) through the motion reversal of the helical cables (39), one proceeds to the closing of the glass or covering (1), which at first slides forwards keeping an upwards slanting position in its front part, then when the entraining bodies (11) meet locks (57), all the stages described above take place in reversed sequence, up to the complete closing, with teeth (51) of tie-rods (55) engaged with teeth (52) of the shaped levers (5). Lastly, the fixed frame (41) is so configured as to constitute, beside a support for guides (20) a peripheral tightness part (58) with gasket (59), and a peripheral channel (60) for the collection of possible water drops, in which drain holes (61) are obtained, connected to the known water drainage ducts generally provided in vehicles. In relation to what has already been described, notches (4) integral with the sliding levers (5) engage the hooking teeth (3') provided in the stiff supports (3) of any type of interchangeable glass covering (1), transparent or opaque, from insulated or non-insulated material or the like.

In a second embodiment of the device, the shaped levers (5), bent forwards in their front parts (117), end with through pins (118). These ends (117) are substantially flush with the front edge (2) which circumscribes the opening of frame (41) of the glass or covering (1).

This delimitation simplifies the global structure of the sun roof, reducing its size and facilitating the assembly operations. The through pins (118) of ends (117) of levers (5) are engaged in the front parts (131) of longitudinal eyelets (132), with upwardly bent lengths (133) provided on two parallel and opposing arms (122), which are integral with the sides of each carriage (24). Arms (122) slide in the side guides of each section (20). Each carriage (24) couples with its own entraining body (111) by means of side slides (115) which engage slidingly into the longitudinal eyelets (132) of the side arms (122). In one of the eyelets, also a small pin (160) engages, which is integral with a tooth (161). The latter can slide within a vertical groove (62) provided on each entraining body (111) and can engage in a small hollow space (63) provided on the bottom of sections (20).

Each entraining body (111) comprises also an upper protruding pin (110) which is the fulcrum of the end of a plate (80) which, at its other end, engages in a pin (70) provided on each lever (5) near its slanting deviation.

When the sun roof (1) is closed, each tooth (161) is engaged in the small hollow space (63), with the corresponding pin (160) aligned with the horizontal part of the corresponding eyelet (132), which means that carriages (24) are all forward positioned, together with their opposing arms (122). In this position, all levers (13) are lowered, carriages (24) face the entraining bodies (111), which, on their turn, hit locks (64) and are connected to guides (20) through teeth (161). Levers (5) are drawn downwards by the through pins (118), engaged in the lower part of eyelets (132), and by pins (12), fully lowered and engaged in slits (9) of the shaped levers (5).

In the opening stage, carriages (24) are drawn backwards by teeth (37), which engage in the side housings (38) and which are connected to flexible cables which run along paths (40) formed in sections (20). The traction on these cables is obtained, as stated hereinabove, by hand or through electric means of a known type. During the pull of the carriage, the toothed sectors (14) rotate on racks (27), levers (13) rise and pins (12) lift the sun roof (1), sliding in slits (9) of the shaped levers (5). Together with carriages (24) also the respective arms (122) slide backwards, while the entraining bodies (111) remain still in their place, being locked by teeth (161) engaged in the hollow spaces (63). The lifting of the shaped levers (5), which is due to the rotation of levers (13) causes the through pins (118) to lift, pushed by the backwards movement of the slanting lengths (133) of eyelets (132), while plates (80) are obliged to make a rotation around pins (110) of the respective entrainers (111), in standstill position because of the aforementioned engagement of teeth (161).

This rotation, caused by the fixed position of pin (110) on entraining bodies (111), and by the connection of plates (80) with pins (70), causes a backwards sliding of lever (5).

These vertical and backwards translations allow the lifting of the front part of the sun roof (1) and its slight backwards shifting during the lifting of its rear part, caused by the full rotation of lever (13), without causing any deformation or compression of gasket (59). While pins (12) reach their position of maximum height, eyelets (132) have shifted backward enough to direct pins (160) into the upwards slanting lengths (133).

This sliding causes pins to be lifted by the trailing on the slanting lengths and teeth (161) to be taken out of the respective hollow spaces (63).

To obtain a full disengagement, also the entraining bodies (111) may be entrained backwards, and this causes the start of the full translation of the sun roof which is lifted and bent upwards in its back part. In the entrainment, through pins (118) engage in the front ends (131) of eyelets (132).

In the closing stage, at the end of travel the entraining bodies (111) hit and stop against the respective locks (64), while carriages (24) with the respective side arms (122) are pushed downwards by the slanting lengths (133) of eyelet (132), and teeth (161) engage in the hollow spaces (63). Afterwards, the parallel small levers (28) close, causing the circular sector (14) of lever (13) to rotate, pins (12) to lower, causing the sun roof (1) to return and close through the sliding in slits (9) of the shaped levers (5), which disengage by rotating the through pins (118) of the front parts (131) of eyelets (132), and, because of the sliding of arms (122), cause the same to trail in the slanting lengths (133) of the eyelets until they engage in the lower rectilinear lengths. The movement is helped by the rotation of plates (80) around pins (110) of bodies (111) together with the connection with pins (70) of levers (5).

At the end, the sun roof (1) is fully closed, adheres to the peripheral gasket (59) and is kept pressed downwardly to obtain a perfect tightness.

FIGS. 12 through 16 show alternative and additional locking means besides those already illustrated and described.

According to such configurations, pins (12) provided at the ends of levers (13) provided with a toothed circular sector (14), besides engaging into the axial slits (9) provided on the shaped levers (5) which support the sun roof (1), protrude outside with extensions (180).

With reference to the closing maneuver of the sun roof (1), each mobile carriage (24) is caused to slide forward towards the front part of the vehicle or the like on which the sun roof is applied. Levers (13) rotate around their fulcrum pin (26) and the end pins (12) lower, entraining in the movement the shaped levers (5) which support and lock the sun roof (1).

Once the sun roof (1) is almost fully lowered, the end extensions (180) of pins (12) of levers (13) engage with openings (84) of grooves (81) formed on the fixed side walls of sections (20) constituting the support structures.

Following the sliding of mobile carriages (24), extensions (180) engage in openings (84) and start trailing along the upper walls (85) of grooves (81), down-slanting or horizontally flush with filleted or slanting stress raising opening (85').

During such translation, the extensions shift therefore also downwards, entraining in the movement both the shaped levers (5) engaged through pins (12) in slits (9) and the sun roof (1) engaged in the shaped levers (5). In this way the sun roof (1) is closed, pressed against the peripheral tight-gaskets (59) and safely connected through the engagement of extensions (180) in grooves (81).

The reverse translatory movement of carriages (24) allows the opposite operation of hooking, lifting and opening of the sun roof (1).

The conceptual simplicity and the arrangement of the hooking means near the devices for activating the sun roofs (1) facilitate the construction of the assemblies, make them more practical and economical and ensures a safe tightness.

On the basis of what has been described and illustrated it should also be specified that the hooking device can always be utilized either in a double configuration for each carriage (24), as seen, or in a simple configuration, on either side of each carriage with a hooking safety which is ensured in every case. In other possible embodiments, if a higher or exasperated hooking safety should be obtained, it is possible to increase the number of the devices. In such cases, it suffices to provide the hooking devices with side plates (82) which, by means of through-holes (86) engage extensions (180) of pins (12) of levers (13) and connect slidingly with the side edges of the shaped levers (5).

On the side plates (82) one or more protruding pins (83) are located, which, following analogous movements of extensions (180), being engaged in same and sliding in the same way as the shaped levers (5), engage in as many openings (84') and grooves (81') formed on the fixed sections (20).

The above pltes (82), provided with protruding pins (83) and the corrresponding grooves (81') with mouths (84') may be provided either on both opposing sides of the shaped levers (5), as shown on FIG. 15, or on only one of the sides.

As can be noticed, the hooking devices are located next to and coupled with mobile carriages (24) the position of which relatively to the whole folding sun roof (1) and depending on the maximum lift of same, produced by the rotation of levers (13) provided with a toothed round sector (14), is located in the front part, before the ideal center line of the opening corresponding to the sun roof. This condition is valid and sufficient, but not limitative, even with the utilization of the side plates (82).

The above side locking means, described with special reference to the embodiment provided with grooves (81) (81') obtained in the fixed parts and pins or extensions (180) (83) in the mobile parts, may also been realized according to an opposite configuration, with pins protruding from the fixed parts and grooves obtained in the mobile parts.

We claim:

1. An activation device for opening and closing a sun roof for a motor vehicle, said device comprising:
   a) a tow-sliding carriage (24) guided for sliding movement in a guide section (20), said carriage including a gear rack (27) and parallel opposing side arms (122) extending forwardly, each side arm having an elongated eyelet (132) with an upwardly bent front end length (133);
   b) a round sector lever (13) having a toothed round sector (14) adapted for engagement with gear rack (27) of said carriage (24), said sector lever (13) including fulcrum pins (26) and end pins (12);
   c) an entraining body (111) having side slides (115) adapted for sliding engagement in the elongated eyelets (132) of the side arms (122) of said carriage (24), said entraining body (111) including a fulcrum pin (110) connected to a first lever (80) and a fulcrum pin (29) connected to a pair of side levers (28), said side levers (28) being provided with slits (30) therein to slidingly accept the fulcrum pins (26) of said sector lever (13), said entraining body (111) further including a vertical slit (62) for slidingly accepting a tooth (161) having a side pin (160), said side pin (160) being adapted for sliding engagement with the elongated eyelet (132) of said side arm (122) of the carriage (24);
   whereby said side pin (160) is disposed in a horizontal portion of said eyelet (132) when the sun roof is closed and said tooth (161) is simultaneously engaged with a hollow space (63) in said guide section (20), and side pin (160) is disposed in the upwardly bent front end length (133) of eyelet (132) when the sun roof is open so that the tooth (161) is lifted and disengaged from the hollow space (63) in said guide section (20);
   d) a shaped lever (5) supporting said sun roof and having an elongated slit (9) adapted for engagement with the end pins (12) of said round sector lever (13), said lever (5) including through pins (118) at a front end (117) thereof adapted for engagement with the elongated eyelet (132) of the side arm (122) of the carriage (24), said lever (5) further including a fulcrum pin (70) connected to the first lever (80) of said entraining body (111); and
   e) locking means comprising an extension (180) of one of said end pins (12) adapted for engagement with a downwardly slanting corresponding side groove (81) having an opening (84) and an upper internal filleted wall (85).

2. An activation device for opening and closing a sun roof for a motor vehicle, said device comprising:
   a) a tow-sliding carriage (24) guided for sliding movement in a guide section (20), said carriage including a gear rack (27) and parallel opposing side arms (122) extending forwardly, each side arm having an elongated eyelet (132) with an upwardly bent front end length (133);
   b) a round sector lever (13) having a toothed round section (14) adapted for engagement with gear rack (27) of said carriage (24), said sector lever (13) including end pins (12);
   c) an entraining body (111) having side slides (115) adapted for sliding engagement in the elongated eyelets (132) of the side arms (122) of said carriage (24), said entraining body (111) including a pair of side levers (28), said side levers (28) being provided with slits (30) therein to slidingly accept the fulcrum pins (26) of said sector lever (13), said entraining body (111) further including a tooth (161) having a side pin (160), said side pin (160) being adapted for sliding engagement with the elongated eyelet (132) of said side arm (122) of the carriage (24);
   d) a shaped lever (5) supporting said sun roof and having an elongated slit (9) adapted for engagement with the end pins (12) of said round sector lever (13), said lever (5) including through pins (118) at a front end (117) thereof adapted for engagement with the elongated eyelet (132) of the side arm (122) of the carriage (24); and
   e) locking means comprising an extension (180) of one of said end pins (12) adapted for engagement with a downwardly slanting corresponding side groove (81) having an opening (84) and an upper internal filleted wall (85), and further including a side plate (82) having a hole (86) for receiving said extension (180) of said end pin (12), said side plate being adapted to slide along said shaped lever (5) and having a protruding pin (83) adapted for engagement with a corresponding complementary hollow space (81') in said guide section (20).

3. An activation device for opening and closing a sun roof for a motor vehicle, said device comprising:
   a) a tow-sliding carriage (24) guided for sliding movement in a guide section (20), said carriage including a gear rack (27) and parallel opposing side arms (122) extending forwardly, each side arm having an elongated eyelet (132) with an upwardly bent front end length (133);
   b) a round sector lever (13) having a toothed round sector (14) adapted for engagement with gear rack (27) of said carriage (24), said sector lever (13) including end pins (12);
   c) an entraining body (111) having side slides (115) adapted for sliding engagement in the elongated eyelets (132) of the side arms (122) of said carriage (24), said entraining body (111) including a pair of side levers (28), said side levers (28) being provided with slits (30) therein to slidingly accept the fulcrum pins (26) of said sector lever (13), said entraining body (111) further including a vertical slit (62) for slidably engaging a tooth (161) having a side pin (160), said side pin (160) being adapted for sliding engagement with the elongated eyelet (132) of said side arm (122) of the carriage (24);
   d) a shaped lever (5) supporting said sun roof and having an elongated slit (9) adapted for engagement with the end pins (12) of said round sector lever (13), said lever (5) including through pins (118) at a front end (117) thereof adapted for engagement with the elongated eyelet (132) of the side arm (122) of the carriage (24); and
   e) locking means comprising an extension (180) of one of said end pins (12) and adapted for engagement with a downwardly slanting corresponding side groove (81) having an opening (84) and an upper internal filleted wall (85) in said guide section (20), and a side plate (82) adapted to slide along said shaped lever (5) by the constraining motion of said pin extension (180), said side plate (82) including at least one protruding pin (83) located beneath the sun roof, aligned and adapted for engagement with a downwardly slanting side groove (81') having an opening (84') and an upper internal filleted wall (85') formed in said guide section (20).

* * * * *